US012738794B2

(12) United States Patent
Tutschka et al.

(10) Patent No.: US 12,738,794 B2
(45) Date of Patent: Sep. 15, 2026

(54) ELECTROMAGNETIC TRANSPORT SYSTEM WITH STATOR DRIVE MODULES CONNECTED BY CABLES WITH EMPTY CONDUITS

(71) Applicant: B&R Industrial Automation GmbH, Eggelsberg (AT)

(72) Inventors: Thomas Tutschka, Oberndorf bei Salzburg (AT); Marc-Frederick Froese, Constance (DE)

(73) Assignee: B&R Industrial Automation GmbH, Eggelsberg (AT)

( * ) Notice: Subject to any disclaimer, the term of this patent is extended or adjusted under 35 U.S.C. 154(b) by 195 days.

(21) Appl. No.: 18/680,849

(22) Filed: May 31, 2024

(65) Prior Publication Data

US 2024/0429771 A1 Dec. 26, 2024

(30) Foreign Application Priority Data

Jun. 2, 2023 (AT) ............................... A50434/2023

(51) Int. Cl.
*H02K 5/10* (2006.01)
*H02K 1/12* (2006.01)

(52) U.S. Cl.
CPC ................. *H02K 5/10* (2013.01); *H02K 1/12* (2013.01)

(58) Field of Classification Search
CPC .... H05K 5/0204; H02K 41/02; H02K 41/031; H02K 41/033; H02K 1/148; H02K 1/12;
(Continued)

(56) References Cited

U.S. PATENT DOCUMENTS 4,825,111 A * 4/1989 Hommes ................ H02K 41/02 318/135
5,072,493 A * 12/1991 Hommes .............. B29C 55/165 26/72
(Continued)

FOREIGN PATENT DOCUMENTS

CN 203552790 U 4/2011
CN 109887651 A 6/2019
(Continued)

OTHER PUBLICATIONS

DE-19826373-A1 English Translation.*
(Continued)

*Primary Examiner* — Maged M Almawri
(74) *Attorney, Agent, or Firm* — McCarter & English, LLP; Michael M. Gnibus

(57) ABSTRACT

An electromagnetic transport system includes a stator and at least one transport unit movable along the stator. The stator includes at least one drive module with an airtight housing where a plurality of drive coils are arranged. A supply cable connects the stator or the at least one drive module to a supply voltage for energizing the drive coils. An empty conduit is integrated into the supply cable and is arranged inside an outer sheath of the supply cable. The empty conduit is provided with an opening at a supply-side end of the supply cable. An end of the supply cable is connected to the at least one drive module such that an exchange of a medium between an interior of the at least one drive module, formed by the airtight housing, and an environment in the area of the supply voltage only takes place via the empty conduit.

12 Claims, 4 Drawing Sheets

(58) Field of Classification Search

CPC .. H02K 2201/15; H02K 5/10; H02K 2205/09; B65G 54/02; B60L 13/03; B60L 2200/44; H01B 7/0072

USPC .......... 310/68 R, 12.15, 12.24, 12.05, 12.07, 310/12.09, 12.14, 12.02, 12.11, 15, 12.25, 310/216.099, 216.101, 216.102, 216.103, 310/6, 14

See application file for complete search history.

(56) References Cited

U.S. PATENT DOCUMENTS 5,737,211 A * 4/1998 Hirai .................... H02J 50/10 336/118
5,927,657 A * 7/1999 Takasan .................. H04B 3/56 104/297
8,776,694 B2 * 7/2014 Rosenwinkel ....... B65G 17/345 104/88.02
10,243,441 B2 * 3/2019 Jacobs ................ H02K 41/031
10,608,469 B2 * 3/2020 Floresta ................ H02J 50/10
10,985,685 B1 * 4/2021 Sun ..................... H02P 25/064
11,021,335 B2 6/2021 Sinzenich et al.
11,303,242 B2 * 4/2022 Sun ..................... H02P 25/064
11,309,737 B2 * 4/2022 Floresta ................ H02J 50/10
11,787,649 B2 * 10/2023 Seal .................... B65G 67/12 701/1
2003/0230941 A1 * 12/2003 Jacobs ................ B65G 47/841 310/12.19
2010/0130096 A1 * 5/2010 Baarman ............... A63H 17/26 446/444
2011/0043053 A1 * 2/2011 Shikayama .......... H02K 41/031 310/12.15
2012/0145500 A1 * 6/2012 Staunton ................ H02J 50/10 191/22 R
2012/0247925 A1 * 10/2012 Cooke ................... B65G 23/23 198/619
2013/0019773 A1 * 1/2013 Rosenwinkel ......... B65G 47/96 104/118
2014/0265645 A1 * 9/2014 Jacobs .................... H02K 1/12 310/12.24
2014/0285034 A1 * 9/2014 Krop ................... H02K 41/031 310/12.18
2014/0331888 A1 * 11/2014 Wernersbach ........ B60L 13/006 104/282
2015/0048693 A1 * 2/2015 Prussmeier ........... H02K 11/33 310/12.09
2015/0344233 A1 * 12/2015 Kleinikkink ....... G05B 19/4185 700/230
2017/0183170 A1 * 6/2017 Wernersbach ....... B65G 47/648
2020/0048016 A1 * 2/2020 Sinzenich ............. B65G 45/00
2020/0244152 A1 7/2020 Neubauer et al.

FOREIGN PATENT DOCUMENTS

CN 113572336 A 10/2021
CN 114613530 A 10/2022
DE 19826373 A1 * 12/1999 ............ B60T 13/741
DE 10232219 A1 * 4/2003 ........... F16D 55/226
DE 102017108557 A1 10/2018
DE 102021124836 A1 3/2023
WO 2009010899 A2 1/2009

OTHER PUBLICATIONS

DE 10232219 A1 English Translation.*
A 50434/2023 Austrian Search Report dated Mar. 19, 2024 from AT application A50434/2023 filed on Jun. 2, 2024.

* cited by examiner 1
2
4
4i
41
8
9
10
11
12
21
22
23
V

ELECTROMAGNETIC TRANSPORT SYSTEM WITH STATOR DRIVE MODULES CONNECTED BY CABLES WITH EMPTY CONDUITS

CROSS-REFERENCE TO RELATED APPLICATIONS

The present application claims priority to Austrian Patent Application No. A50434/2023, filed on Jun. 2, 2023, and entitled "ELECTROMAGNETIC TRANSPORT SYSTEM", the disclosure of which is hereby incorporated by reference in its entirety.

TECHNICAL FIELD

The present embodiment relates generally to the field of plant engineering, in particular to the field of automation technology. The present embodiment relates to an electromagnetic transport system comprising a stator and at least one transport unit, which is arranged to be movable along the stator, the stator comprising at least one drive module having an airtight housing, in which a plurality of drive coils is arranged, and a supply cable being provided, which connects the stator or the at least one drive module to a supply voltage for energizing the drive coils.

BACKGROUND

Nowadays, most modern production plants require parts or components to be moved between the individual handling or production stations using transport systems—sometimes also over longer transport paths. Various transport and conveyor systems can be used for this transportation, such as continuous conveyors or conveyor belts in various designs, in which a rotary movement of an electric drive is converted into a linear movement. In the case of continuous conveyors of this type, however, flexibility is considerably limited, and above all individual transport of single transport units is not possible. In order to meet the requirements of modern and flexible transport systems, electromagnetic transport systems in the form of long stator linear motors (LLM for short) and/or planar motors (PM for short) are frequently used, the mode of operation and applications of which are well known from the prior art.

A long stator linear motor generally consists of a stator, which can also be referred to as a "long stator linear motor stator" or "LLM stator," and at least one transport unit, which is also referred to as a "shuttle" or "slider." The stator is usually made up of at least one, usually a plurality of, drive modules. A plurality of drive coils is arranged in a fixed position next to each other on the stator or on the drive modules. In this case, the drive modules can have different geometries (e.g., straight lines, curves, switches, etc.). The individual drive modules are then joined together to form a stator of the desired length and/or shape. The stator then forms a transport path along which one or more transport units can be moved independently of each other. A number of drive magnets is arranged on the transport unit, which magnets generate a magnetic excitation field. This magnet field interacts with an electromagnetic field of the drive coils of the stator or the drive modules, to move the transport unit. By controlling the individual drive coils accordingly—usually by applying a corresponding electrical voltage or energizing the drive coils accordingly—the magnetic flux is controlled in the area of the transport unit and a propulsive force is generated on the transport unit or the magnitude of the propulsive force is influenced, to move the transport unit along the transport path in the desired manner. The stator or the at least one drive module is connected to a supply voltage via a supply cable to energize the drive coils. Examples of long stator linear motors are known for example from WO 2013/143783 A1, U.S. Pat. No. 6,876,107 B2, US 2013/0074724 A1 or WO 2015/042409 A1

Planar motors, which are also used as transport systems, can be used in production processes for very flexible transport processes having complex movement profiles, for example. Like the long stator linear motor, the planar motor also comprises a stator that forms a transport plane, in which one or more transport units can be moved at least two-dimensionally. The stator is usually made up of one or more drive modules. For the movement of the transport unit in the transport plane, a drive force acting on the transport unit is generated—as with the long stator linear motor—in that a magnetic excitation field, which is generated, for example, by drive magnets of the transport unit, interacts with a magnetic field of the stator or the at least one drive module. To cause the transport unit to move in a certain movement direction, at least one of the magnetic fields, usually the magnetic field of the stator or at least one drive module, must be variable over time. The other magnetic field, usually the one on the transport unit, is usually constant or cannot be changed over time and is formed, for example, by permanent magnets, which are also known as drive magnets. The temporally variable magnetic field is generated, for example, by drive coils, which are arranged, for example, in the transport plane of the planar motor (i.e., on the stator or on at least one drive module), and in some embodiments also in a plurality of planes. The drive coils are usually controlled by a control unit and energized accordingly, to generate a moving magnetic field in the desired movement direction. A supply cable is also provided for energizing the drive coils of the drive modules, which cable connects the stator to a supply voltage source.

In order to allow the transport unit to move in two dimensions, which movement is characteristic of the planar motor, two-dimensional interaction of the magnetic fields of the stator and/or of the at least one drive module and of the transport units is required, one of the two magnetic fields needing to be temporally variable in at least two dimensions, or both magnetic fields needing to be temporally variable in at least one dimension. In this case, the drive coils and the drive magnets are advantageously arranged in such a way that, in addition to a one-dimensional movement along the axes spanned by the transport plane, more complex two-dimensional movements of the transport unit in the transport plane are also possible. U.S. Pat. No. 9,202,719 B2 or DE 10 2017 131 324 A1, for example, describes the basic design and mode of operation of a planar motor. Furthermore, applications of a planar motor as a transport system are shown in EP 3 172 156 B1 or in EP 3 172 134 B1.

Typically, the drive modules—both for the long stator linear motor and the planar motor—have a plurality of drive coils which are usually fixed in the drive module. For this purpose, the drive coils are arranged in a precise position on a base body, for example, and then surrounded by a housing. In order to protect the drive coils from external influences, like e.g., moisture, dust and chemical contaminants depending on the field of application of the transport system, the housing of the respective drive module is designed to be airtight or almost hermetically sealed.

By energizing the drive coils or by applying a coil voltage that is regulated in level and duration, heat is generated in the stator or in the individual drive modules during operation of the transport system due to electrical power loss, wherein the heat generation in the stator or in the individual drive modules and also in the individual drive coils of a drive module—depending on a movement profile of the transport unit and a number of movement cycles—can fluctuate over time. The heat generation can cause the temperature of a drive module or in an interior formed by the housing of the drive module to rise. The heat generated in the drive modules of the stator can, for example, be dissipated by cooling, heat conduction and/or other heat equalization mechanisms, or the temperature in the drive modules can drop again by cooling due to decreasing electrical power loss. This can lead to temperature fluctuations in the individual drive modules of the stator during operation of the transport system. Such temperature fluctuations can cause overpressure or negative pressure or pressure fluctuations in a drive module that is sealed in an airtight manner by a housing. Furthermore, external influences, such as changes in the ambient conditions, can lead to overpressure or negative pressure in at least one drive module of the transport system. The pressure fluctuations or pressure differences between a drive module interior and an ambient pressure outside the housing of the drive module can, for example, lead to deformation of the housing or cover plates, weakening of weld seams, or faster aging of seals due to mechanical stress, etc. As a result, there is a risk of mechanical damage to the transport units or the protective function of the housing, for example, as well as a reduction in the availability or service life of the transport system.

In order to prevent overpressure or negative pressure in a drive module, separate pressure equalization elements are used, for example, which may adapt the internal pressure of the closed drive module of the transport system to an ambient pressure. Such pressure equalization elements are usually designed as screw connections having an integrated special diaphragm, which are attached to the housing of the respective drive module accordingly. Depending on the intended use, they are made of plastic material and/or metal, and can also contain washers, seals, sealing rings and/or grommets in addition to the integrated special diaphragm. However, the use of pressure equalization elements in drive modules has the disadvantage that the pressure equalization element takes up a corresponding amount of space on the housing or on the housing surface and can cause additional costs. For example, when used in fields having special hygiene regulations, such as the food and beverage industry, it is necessary to ensure that the pressure equalization elements are clean and food-safe. Furthermore, depending on the design of the pressure equalization element, e.g., cyclical maintenance and/or replacement of components (e.g., diaphragm, seals, etc.) may also be necessary.

Furthermore, when using a pressure equalization element, the pressure is equalized directly with the immediate environment of the transport system or the drive modules. Depending on the field of application of the transport system, this environment can be increasingly characterized by moisture, dirt, dust and/or chemical contaminants, which can penetrate into the interior of the drive module, due to e.g., sealing defects in the screw connection, the diaphragm, etc. of the pressure equalization element, and can lead to a higher maintenance requirement of the transport system or a reduction in the service life.

SUMMARY

It is therefore the object of the embodiments to provide an electromagnetic transport system, in which pressure equalization between the at least one airtight drive module of the transport system and an environment of the transport system can be carried out in a simple and cost-effective manner and without additional assembly and/or maintenance measures.

This and other objects are achieved by an electromagnetic transport system according to the independent claim. Advantageous embodiments of the present disclosure are described in the dependent claims.

According to the present disclosure, the object is achieved by an electromagnetic transport system which comprises a stator and at least one transport unit, which is arranged to be movable along the stator. The stator comprises at least one drive module with an airtight housing, in which a plurality of drive coils is arranged. Furthermore, a supply cable is provided, which connects the stator or the at least one drive module to a supply voltage for energizing the drive coils, an empty conduit being integrated into the supply cable, which empty conduit is arranged inside an outer sheath of the supply cable, wherein the empty conduit is provided with an opening to an environment in the area of the supply voltage (e.g., an interior of a switch cabinet) at a supply-side end of the supply cable, and wherein an end of the supply cable on the drive module side is connected to the at least one drive module in such a way that an exchange of a medium, in particular an air exchange, between an interior of the at least one drive module formed by the airtight housing and the environment of the transport system, in particular in the area of the supply voltage, takes place only via the empty conduit.

The main aspect of the proposed solution is that, when a medium or air is exchanged between the at least one drive module of the electromagnetic transport system and the environment of the transport system, especially in the area of the supply voltage, via the empty conduit integrated in the supply cable, the pressure in the drive module is also equalized with the environment of the transport system via the empty conduit, in the event of overpressure or negative pressure. The pressure equalization in the transport system is therefore only carried out via the empty conduit in the supply cable without any additional work for installation, maintenance, cleaning, etc., of e.g., additional pressure equalization elements, and is therefore also cost-effective. Since the pressure equalization or air exchange takes place via the opening at the supply-side end of the supply cable, which is arranged in the area of the supply voltage (e.g., switch cabinet), the air used for pressure equalization comes from a protected environment (e.g., interior of the switch cabinet). This also reduces the risk of moisture, dirt, dust, chemical contaminants or other contaminants getting into the electromagnetic transport system, especially into the at least one drive module of the stator.

A preferred embodiment of the electromagnetic transport system provides that the stator comprises at least one further drive module, which is connected via a power cable to the at least one drive cable for energizing the drive coils of the further drive module. An empty conduit is also integrated into the power cable, which empty conduit is arranged inside the outer sheath of the power cable. In this case, a first end of the power cable is connected to the at least one drive module of the stator and a second end of the power cable is connected to the at least one further drive module of the stator in such a way that an exchange of the medium, in particular an air exchange, only takes place between an interior of the at least one further drive module formed by the airtight housing and the interior of the at least one drive module via the empty conduit in the power cable. I.e., an exchange of the medium or air in the interior spaces of the drive modules, and thus a pressure equalization between the drive modules, can take place only via the empty conduit integrated in the power cable. As a result, the pressure equalization in a transport system having two or more drive modules can also be carried out cost-effectively and without additional effort. Since the exchange of medium or air for pressure equalization with the environment in the area of the supply voltage takes place only via the empty conduit in the power cables between the interior spaces of the drive modules or via the empty conduit in the supply cable, to which one of the drive modules is connected, the risk of moisture and/or contamination problems due to a moist or contaminated medium (air) is also greatly reduced.

Due to the connection to the power cable, the at least one drive module and the at least one further drive module can form a daisy chain by being connected with the power cable, in which, for example, at least one drive module is connected via the supply cable to the supply voltage, or via the empty conduit and its opening at the supply-side end of the supply cable to the environment in the area of the supply voltage, and the at least one further drive module is connected to the supply voltage and the environment only indirectly—i.e., via the at least one drive module.

It is also advantageous, if a connection between the end of the supply cable on the drive module side and the at least one drive module is designed as a plug-in connection. Ideally, the connections between the first end of the power cable and the at least one drive module, and between the second end of the power cable and the at least one further drive module, are also designed as plug-in connections. This makes it easy to connect the drive modules electrically and also for pressure equalization with the environment and with each other. The connection of the empty conduit on the drive module side to the respective drive module can be made, for example, via holes of unused plug or pin positions in the plug and socket of the plug-in connection, which represent an easy-to-use option for medium or air exchange.

In this case, it is also advantageous, if the plug-in connection between the end of the supply cable on the drive module side and the at least one drive module, and/or the plug-in connections between the first end of the power cable and the second end of the power cable and a respective drive module, are additionally sealed using a union nut. This ensures that the medium or air exchange actually only takes place between the drive module and the environment in the area of the supply voltage (e.g., switch cabinet interior) or between the respective drive modules.

Another embodiment provides for the empty conduit at the supply-side end of the supply cable to protrude beyond the supply-side end of the supply cable. In this case, the empty conduit can have a protrusion of approx. 10 millimeters, for example. The opening of the empty conduit at the supply-side end of the supply cable thus protrudes safely into the environment in the area of the supply voltage, in particular into the interior of the switch cabinet.

Ideally, the empty conduit in the supply cable or in the power cables is made of plastic material. Polyamide, for example, can be used as the plastic material.

BRIEF DESCRIPTION OF THE DRAWINGS

The present disclosure is described in greater detail below with reference to FIGS. 1 to 4, which show schematic and non-limiting advantageous embodiments by way of example. In the figures.

DETAILED DESCRIPTION

Figure 1:
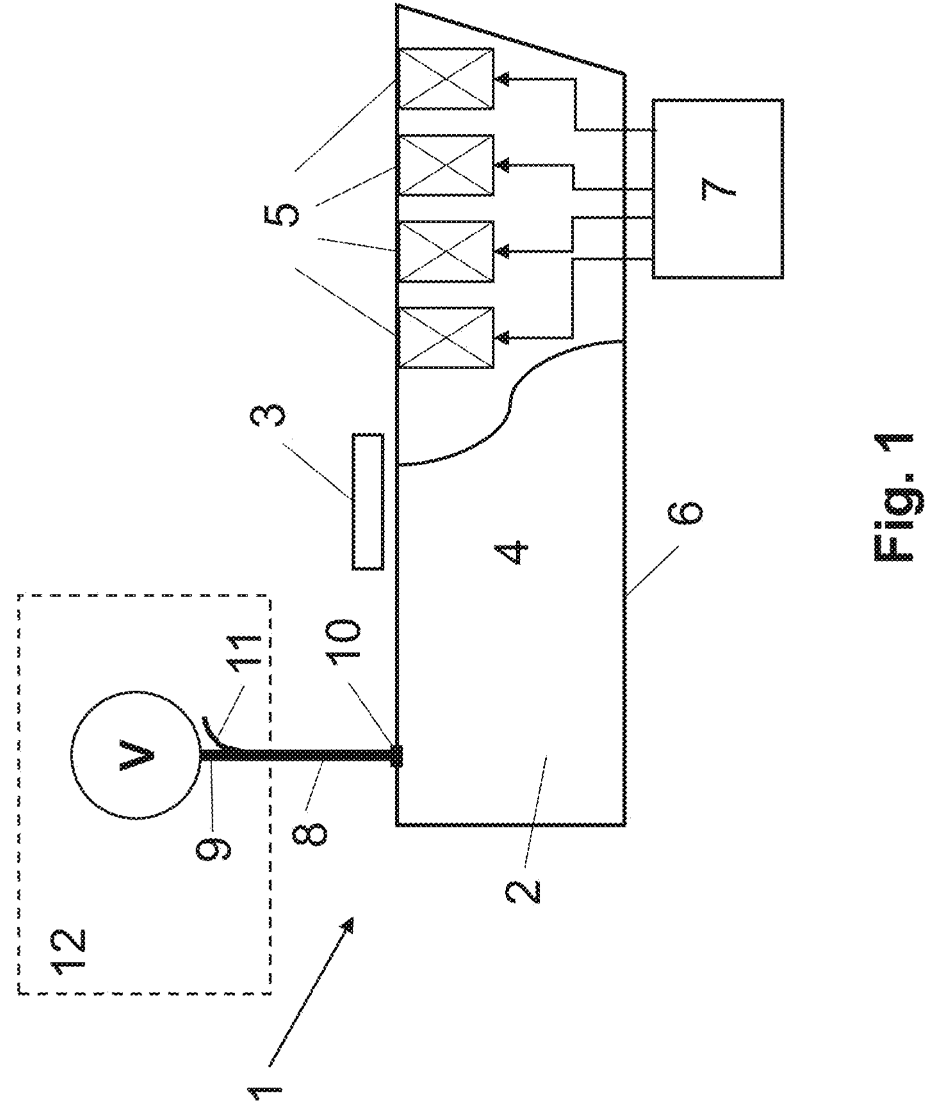
FIG. 1 shows a very simple embodiment, by way of example, of an electromagnetic transport system according to an embodiment
Figure 3:
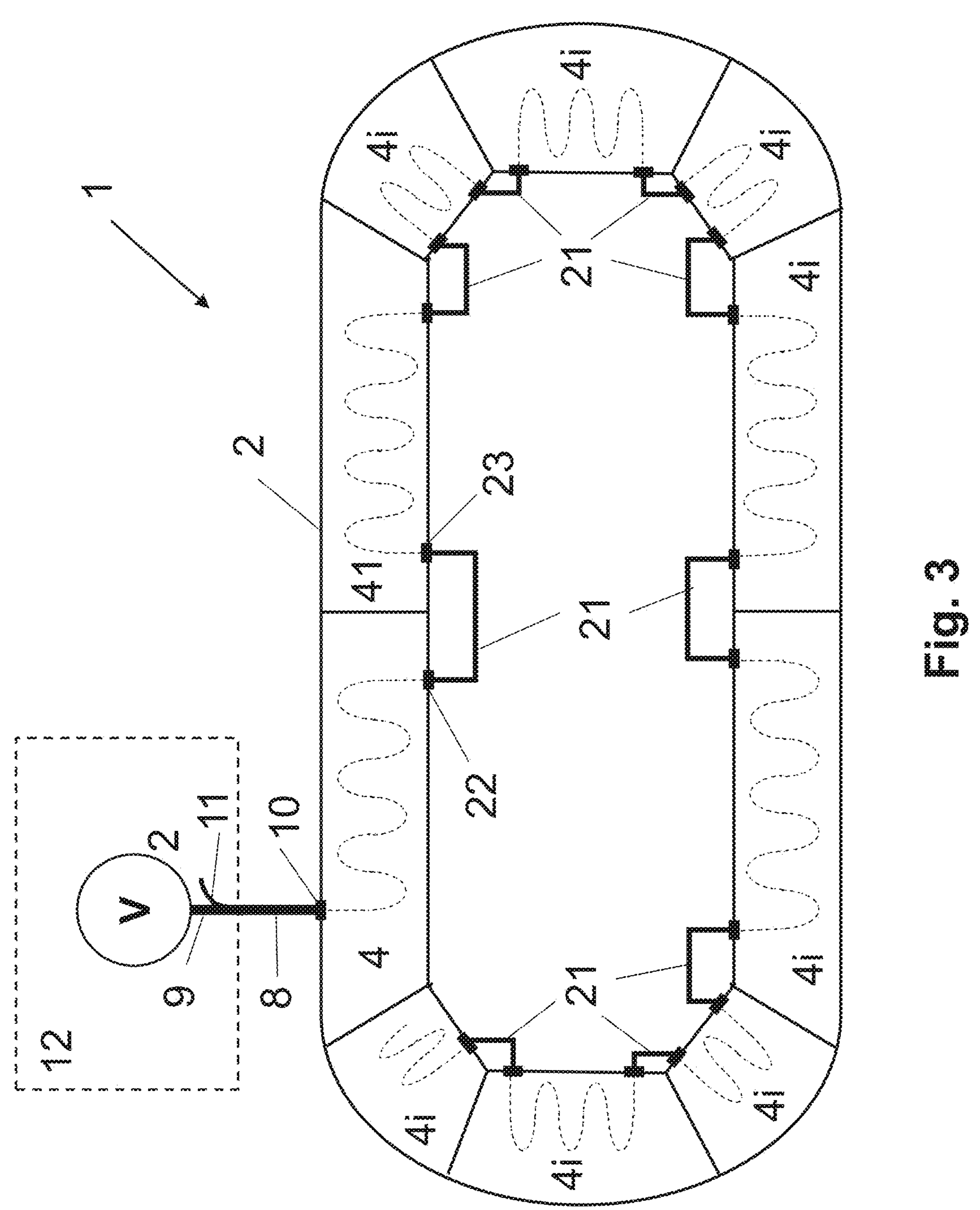
FIG. 3 shows a transport system, by way of example, in the form of a long stator linear motor having a plurality of drive modules wired through the supply cable
Figure 4:
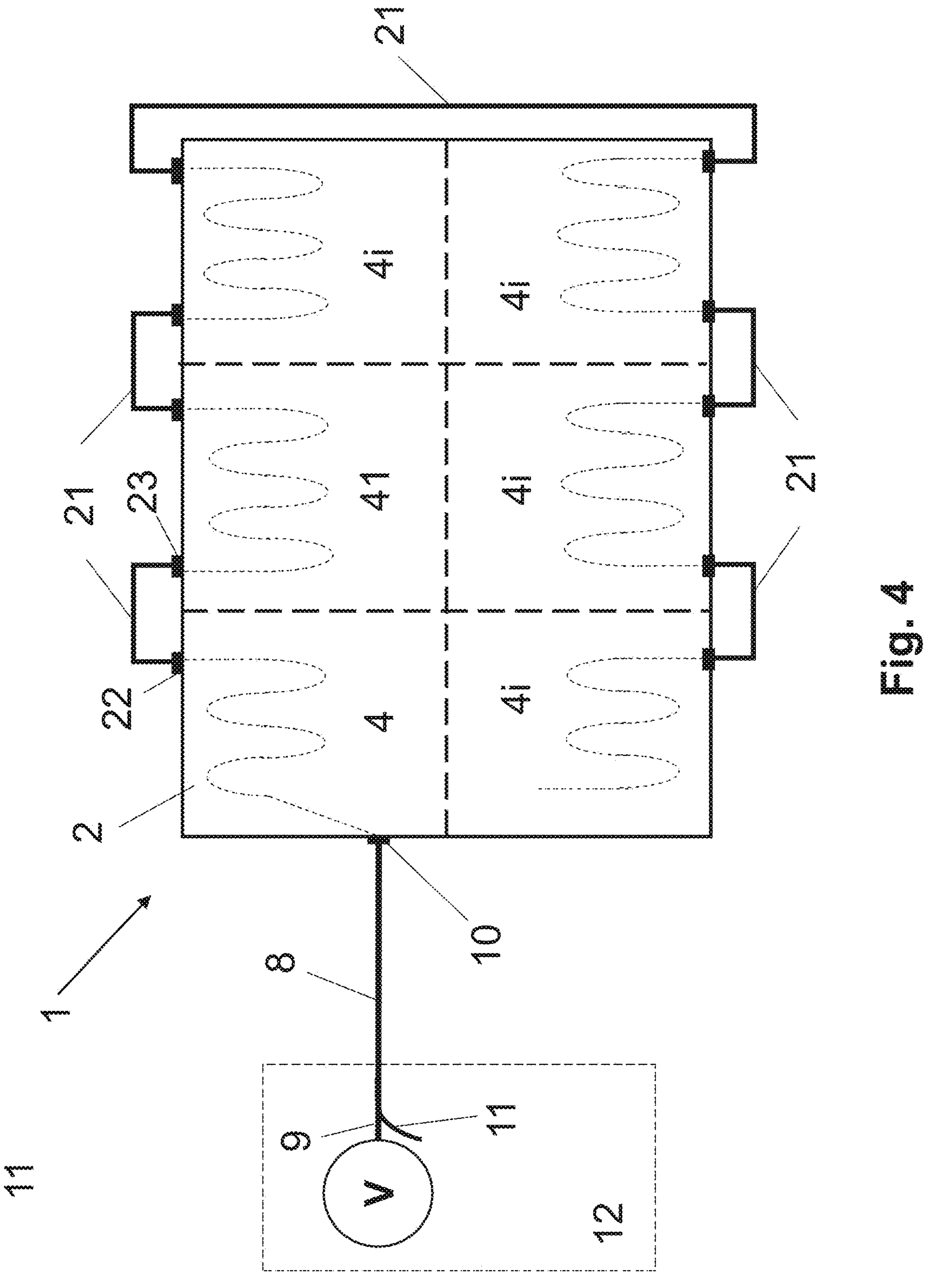
FIG. 4 shows a transport system, by way of example, in the form of a planar motor having a plurality of drive modules wired through the supply cable

FIG. 1 schematically shows a very simple embodiment, by way of example, of an electromagnetic transport system 1, which may be designed either in the form of a long stator linear motor, as exemplary shown in FIG. 3, or in the form of a planar motor, as exemplary shown in FIG. 4. The transport system 1 comprises a stator 2 and at least one transport unit 3. The stator 2 forms the possible transport path or the possible transport plane of the transport system 1 for the at least one transport unit 3, in that the transport unit 3 can be moved along the stator 2.

In the simplest case—as shown by way of example in FIG. 1—the stator 2 consists of at least one drive module 4. Typically, the stator 2 of an electromagnetic transport system 1 consists of several or a plurality of separate drive modules 4. A plurality of drive coils 5 is arranged on the drive module 4—exemplary shown in FIG. 1 only for part of the drive module 4. The drive coils 5 are usually arranged and fixed in a precise position on a base body (not shown in FIG. 1). Furthermore, the drive module 4 comprises a housing 6 which surrounds at least the drive coils 5. The housing 6 of the drive module 4 can be designed to be airtight or almost hermetically sealed, to protect the drive coils 5 and any sensors, electronics, etc. arranged on the drive module 4 from various external influences (e.g., moisture, dust, chemical contaminants, etc.) to which the transport system 1, in particular the stator 2, is exposed depending on the field of application of the transport system 1.

For example, a control unit 7 is provided to control the movement of the at least one transport unit 3. The control of the movement of the transport unit 3 along the transport path or the transport plane and the associated actuation of the drive coils 5 involved are well known e.g., from EP 3 385 110 A1 or EP 3 376 166 A1 for transport systems 1 in the form of long stator linear motors, or from WO2021/105165 A1 or WO 2021/175885 A1 for transport systems 1 in the form of planar motors. However, since the specific control or actuation of the drive coils 5 is not important for an embodiment, this will not be explained in more detail here. In principle, the drive coils 5 in the area of the at least one transport unit 3 are energized, or a coil voltage is applied, to generate a moving drive magnetic field by actuating the control unit 7 accordingly. This drive magnetic field interacts with drive magnets arranged on the transport unit 3, thereby causing the transport unit 3 to move in a desired direction of movement.

The transport system 1 comprises a supply cable 8 to be able to apply the coil voltage specified by the actuation to the drive coils 5, or to be able to energize the drive coils 5 accordingly to move the transport unit 3. The stator 2 or the at least one drive module 4 of the stator 2 is connected to a supply voltage V via the supply cable 8. The supply cable 8 can also be used, for example, to supply other units provided on the drive module 4 (e.g., sensors, electronic units, local control units, etc.) with the supply voltage V.

The supply cable 8 is connected to the supply voltage V at a supply-side end 9 for the voltage supply of the transport system 1. The supply voltage V can be arranged in a switch cabinet together with other units for control, monitoring, etc. of the transport system 1, for example, wherein the switch cabinet then forms an environment 12 of the supply voltage V. The supply-side end 9 of the supply cable 8 can be assembled accordingly, depending on the embodiment or cable type of the supply cable 8 (e.g., cable comprising one power conductor 15, 16 for energy transmission; cable comprising two power conductors 15, 16 for energy transmission; cable which also comprising at least one signal line 17, etc.). In other words, the supply-side end 9 of the supply cable 8 has corresponding connections to establish an electrical connection between the supply cable 8 or the at least one power conductor 15, 16 and the supply voltage V. If the supply cable 8—as exemplary shown in FIG. 2—also comprises at least one signal conductor 17 for signal transmission between the stator 2 or the at least one drive module 4 and e.g., control units, measuring units, units for safety technology, etc., then the supply-side end 9 of the supply cable 8 can have further, corresponding connections which can establish a connection of the at least one signal conductor 17 to these units, for example.

Furthermore, an empty conduit (capillary) 11 is integrated into the supply cable 8, which empty conduit is arranged inside an outer sheath 13 of the supply cable 8 largely in parallel with the at least one power conductor 15, 16. At the supply-side end 9 of the supply cable 8, the empty conduit 11 is assembled with an open end—i.e., the empty conduit 11 ends at the supply-side end 9 of the supply cable 8 with an opening, which connects an interior space 20 of the empty conduit 11 with the environment 12 of the supply voltage V—e.g., with an interior space of the switch cabinet, in which the supply voltage V is arranged. In this case, the empty conduit 11—as shown in FIG. 1—can protrude beyond the supply-side end 9 of the supply cable 8, for example with a protrusion (e.g., of 10 mm or more).

An end 10 of the supply cable 8 on the drive module side is connected to the stator 2 or to the at least one drive module 4 to supply the stator 2 with electrical energy or voltage and to transmit signals, provided that at least one signal conductor 17 is provided in the supply cable 8. Furthermore, the connection between the end 10 of the supply cable 8 on the drive module side and the at least one drive module 4 is designed such that an exchange of a medium or an air exchange between an interior of the at least one drive module 4 formed by the airtight housing 6 and the environment 12 takes place exclusively via the empty conduit 11. In other words, the medium or the air in the interior of the drive module 4 can be exchanged with the environment 12 in the area of the supply voltage V (e.g., interior of the switch cabinet) only via the empty conduit 11.

For this purpose, the connection between the end 10 of the supply cable 8 on the drive module side and the drive module 4 can be designed as a plug-in connection, for example. For this purpose, a respective connection element can be provided both on the end 10 of the supply cable 8 on the drive module side and on the drive module 4 or in the housing 6 of the drive module 4. The connection elements may be designed in such a way that they fit together and establish an electrically conductive connection at least for the voltage supply of the stator 2 or the drive module 4 and, if necessary, for signal transmission. The connection elements at the end 10 of the supply cable 8 on the drive side and on the drive module 4 can be assembled according to the respective embodiment of the supply cable 8—e.g., one power conductor 15, 16, two power conductors 15, 16, none or at least one signal conductor 17. For the plug-in connection, for example, the connection element at the end 10 of the supply cable 8 on the drive side can be designed as a socket, and the connection element on the drive module 4 can be designed as a plug. However, it is also conceivable that the connection element at the end 10 of the supply cable 8 on the drive side is designed as a plug, and the connection element on the drive module 4 is designed as a socket.

For the exchange of the medium or air between the interior of the drive module 4 and the environment 12 via the empty conduit 11, the empty conduit 11 can end in the connection element, which is attached to the end 10 of the supply cable 8 on the drive module side. For this purpose, both the connection element at the end 10 of the supply cable 8 on the drive module side and the connection element on the drive module 4 are additionally designed so that the medium or air can only be exchanged between the interior of the drive module 4 and the environment 12 via the empty conduit 11. For this purpose, the connection elements can have e.g., through-holes, etc., for the air exchange. Ideally, existing through-holes in the connection elements can be used for the medium or air exchange between the interior of the drive module 4 and the empty conduit 11 in the supply cable 8. These through-holes in the respective connection element are usually unused positions that could be used for connections or pins for connecting signal lines 17, for example. The unused through-holes in the connection elements (e.g., plug and socket) can be used, for example, to connect the empty conduit 11 in the supply cable 8 to the interior of the drive module 4, and thus for the exchange of the medium or air between the interior of the drive module 4 and the environment 12 via the empty conduit 11. In addition, the connection between the end 10 of the supply cable 8 on the drive module side and the drive module 4, which is e.g., designed as a plug-in connection, can be sealed airtight with a union nut to ensure that the medium or air exchange takes place exclusively via the empty conduit 11 integrated in the supply cable 8.

The exchange of the medium or air between the drive module 4 or its interior and the environment 12 in the area of the supply voltage V, such as the interior of the switch cabinet in which the supply voltage V is arranged, also results in pressure equalization between the interior of the drive module 4 and the environment 12, such as the interior of the switch cabinet. During operation of the transport system 1, the drive module 4 may heat up due to electrical power loss, primarily as a result of the drive coils 5 being energized. The medium (e.g., air) inside the drive module 4 expands. Due to the airtight housing 6 of the drive module 4, this results in increasing pressure or overpressure in the drive module 4. The overpressure can be released by the air exchange with the environment 12, via the empty conduit 11 or the capillary 11 in the supply cable 8. The pressure in the interior of the drive module 4 can thus be adjusted to the pressure of the environment 12 in the area of the supply voltage V.

If the energization of the drive coils 5 is terminated or interrupted in the drive module 4 during operation of the transport system 1 because no transport unit 3 is currently intended to be moved along the drive module 4, the drive module 4 cools down due to decreasing electrical energy loss. The medium or the air in the airtight housing 6 of the drive module 4 contracts due to the cooling, resulting in a falling pressure or negative pressure in the drive module 4.

This negative pressure can also be equalized by the air exchange with the environment 12 via the empty conduit 11 or the capillary 11 in the supply cable 8. For example, air from the environment 12 (e.g., the interior of the switch cabinet) is drawn into the drive module 4 via the empty conduit 11, thereby adjusting the internal pressure to the pressure of the environment 12 again.

The medium or air is exchanged via the opening of the empty conduit 11 at the supply-side end 9 of the supply cable 8. In other words—in particular when equalizing a negative pressure inside the housing 6 of the drive module 4—air is drawn from the environment 12 of the supply voltage V (e.g., inside the switch cabinet). This environment 12 represents a protected environment to a certain extent, which reduces the risk of moisture and/or contamination problems.

External influences, such as changes in the ambient conditions, temperature changes in the environment of the transport system 1, etc., can also lead to heating or cooling of the drive module 4 and thus to pressure fluctuations inside the drive module 4, which can be equalized via the empty conduit 11 integrated in the supply cable 8.

Figure 2:
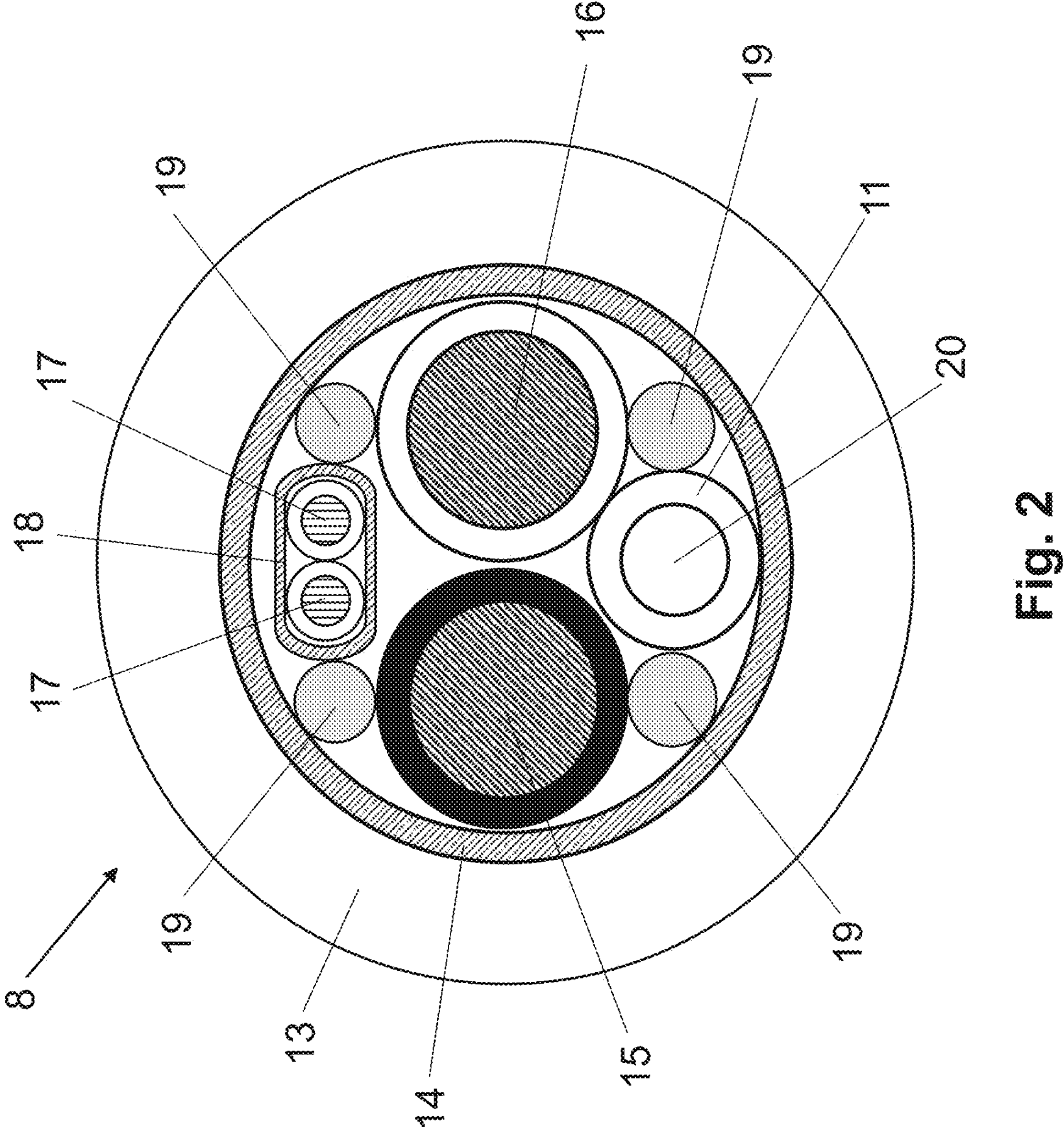
FIG. 2 is a cross section of the supply cable of the transport system according to an embodiment

FIG. 2 exemplary shows a schematic cross section of the supply cable 8, via which the stator 2 or the at least one drive module 4 is connected to the supply voltage V. The supply cable 8 has an outer sheath 13 made of a thermoplastic material (e.g., thermoplastic polyurethane or TPU for short). A braid 14 is arranged on an inner side of the outer sheath 13, e.g., for shielding and/or for stability of the cable 8. At least one power conductor 15, 16 surrounded by an insulation is arranged in a cavity formed by the outer sheath 13. As DC voltage is often used for the voltage supply of electromagnetic transport systems 1, the supply cable 8 has, for example, two power conductors 15, 16, via which the energy is transmitted or the voltage is supplied to the stator 2 connected to the supply voltage V via the supply cable 8. Furthermore, the supply cable 8 can also comprise at least one signal conductor 17. In the cross section through the supply cable 8, exemplary shown in FIG. 2, two signal conductors 17 are provided for connecting wired safety technology. The signal conductors 17 have insulation, for example, and can be insulated from the power conductors 15, 16 by their own sheathing 18 or shielding 18. Control signals, measurement signals, etc. can be transmitted between the transport system 1 or the stator 2 and control units, safety technology units, etc. via the signal conductors 17. The supply cable 8 also has filling elements 19, which ensure corresponding stability of the supply cable 8.

Furthermore, the empty conduit 11 or the capillary 11 is integrated into the supply cable 8. The empty conduit 11 can, for example, be arranged in the cavity formed by the outer sheath 13 and extend in parallel with the power conductors 15, 16. The empty conduit 11 or the capillary 11 is made of plastic material (e.g., polyamide) and can have an inner diameter and outer diameter in the millimeter range, for example. The empty conduit 11 can have an inner diameter of approx. 1.5 to 2 millimeters and an outer diameter of approx. 3 millimeters, for example. During operation of the transport system 1, the cavity formed by the interior 20 of the empty conduit 11 is used for air exchange or pressure equalization between the drive module 4 of the stator 2 and the environment 12 of the supply voltage V, when the drive module 4 of the stator 2 is connected to the supply voltage V via the supply cable 8.

If the stator 2 of a transport system 1—as shown below in FIGS. 3 and 4—comprises at least one further drive module 41, in addition to the at least one drive module 4, then the second drive module 41 can be connected to the at least one drive module 4 via a power cable 21 to electrically connect the at least one further drive module 41 to the supply voltage V via the drive module 4. In other words, the at least one further drive module 41 is indirectly connected to the supply voltage V via the drive module 4, which is directly connected to the supply voltage V via the supply cable 8.

The power cable 21 usually has a structure that is identical to that of the supply cable 8. The power cable 21 can also be designed as shown in FIG. 2, for example. In any case, an empty conduit 11 made of plastic material (e.g., polyamide) is also integrated into the power cable 21, which is arranged, for example, in parallel with the at least one power conductor 15, 16 inside the outer sheath 13 of the cable 21. The power cable 21 is connected—for the connection between the drive module 4 and the further drive module 41—by a first end 22 to the drive module 4 and by a second end 23 to the further drive module 41, wherein the connections are each designed in such a way, that an exchange of the medium or the air between an interior of the further drive module 41, which is formed by the airtight housing 6 of the further drive module 41, and the interior of the at least one drive module 4, takes place exclusively via the empty conduit 11 or the capillary 11 in the power cable 21. In other words, an air exchange and thus pressure equalization between the at least one drive module 4 and the other drive module 41 takes place via the empty conduit 11 integrated into the power cable 21. The connections between the first end 22 of the power cable 21 and the drive module 4, or between the second end 23 of the power cable 21 and the further drive module 41, can be designed as plug-in connections, for example. For this purpose, matching connection elements can be provided both at the ends 22, 23 of the power cable 21 and on the drive modules 4, 41. For example, the connection elements at the ends 22, 23 of the power cable 21 can be designed as sockets, and the connection elements on the drive modules 4, 41 can be designed as plugs. However, the connection elements of the power cable 21 can also be designed as plugs, and the connection elements of the drive modules 4, 41 as sockets. Furthermore, the plug-in connection between the respective end 22, 23 of the power cable 21 and the respective drive module 4, 41 can be sealed airtight, e.g., by means of a union nut, to ensure an exchange of medium or air via the empty conduit 11 integrated into the power cable 21.

FIG. 3 exemplary shows a schematic view of a further embodiment of an electromagnetic transport system 1, the transport system 1 being designed in the form of a long stator linear motor. In this case, the transport system 1 consists of a plurality i of separate drive modules 4, 41, **4*i* which are combined to form a stator 2 of the long stator linear motor. The drive modules 4, 41, 4*i* each have an airtight housing 6, in which the drive coils 5 are arranged, and can be arranged on a fixed, support structure (not shown in FIG. 3), for example. The stator 2 forms the possible transport path, which—as exemplary shown in FIG. 3—can be closed or open. The transport path can also have a plurality of branches, which in turn can be open or closed and are connected to each other via switches. The drive modules 4, 41, 4*i*** can also be designed in different geometric shapes, for example straight modules or curved modules, in order to be able to realize different transport paths, as described for example in EP 3 243 772 B1.

At least one drive module 4 of the stator 2 is connected to the supply voltage V via the supply cable 8. This drive module 4—referred to below as the first drive module 4—is connected via the power cable 21 to a further drive module 41 (referred to below as the second drive module 41), resulting in the second drive module 41 being also electrically connected—via the first drive module 4—to the supply voltage V. This is indicated by the dashed line extending through the first drive module 4. The second drive module 41 is also electrically connected to a further drive module **4*i* via a power cable 21. This means that the further drive module 4*i* is supplied with energy from the supply voltage V indirectly—via the first drive module 4 and the second drive module 41 (as indicated by the dotted lines extending in the drive modules 4, 41). The further drive modules 4*i* can also be connected to each other in series via power cables 21 until all drive modules 4, 41, 4*i* are at least indirectly connected to the supply voltage V. In addition to the energy supply, signals can also be transmitted via the supply cable 8 and the power cables 21 to or from all drive modules 4, 41, 4*i*, provided that the supply cable 8 and the power cables 21 comprise at least one signal conductor 17. Due to the connection via the power cables 21, the drive modules 4, 41, 4*i* form what is known as a daisy chain, in which the first drive module 4 is directly connected to the supply voltage V, via the supply cable 8. All further drive modules 41, 4*i* are indirectly connected to the supply voltage V via their respective predecessor drive module 4, 41, 4*i***.

Since the empty conduit 11 is integrated in both the supply cable 8 and the power cables 21, and the drive modules 4, 41, **4*i* and the connections between the cables 8, 21 and the drive modules 4, 41, 4*i* are airtight, the medium or air is exchanged between the drive modules 4, 41, 4*i* only via the empty conduit 11 in the respective power cable 21. In this case, the medium or air is exchanged between the first drive module 4 and the second drive module 41 via the empty conduit 11 in the power cable 21, and with the environment 12 of the supply voltage V (e.g., switch cabinet interior) via the empty conduit 11 in the supply cable 8. For the exchange of medium or air with the environment 12, the empty conduit 11 integrated in the supply cable 8 ends with an opening at the supply-side end 9 of the supply cable 8, wherein the opening connects the interior 20 of the empty conduit 11 to the environment 12 of the supply voltage V—e.g., the interior of the switch cabinet. Pressure equalization between the drive modules 4, 41, 4*i* and the environment 12 in the area of the supply voltage V thus also takes place via the empty conduits 11, which are integrated in the power cables 21 or in the supply cable 8. The drive modules 4, 41, 4*i* are protected from possible adverse influences (e.g., dirt, moisture, etc.) by the environment 12** of the supply voltage V (e.g., switch cabinet interior), which is generally protected from moisture, dust or other contaminants.

FIG. 4 exemplary shows a schematic view of an electromagnetic transport system 1 in the form of a planar motor. The transport device 1 comprises a stator 2 which forms a transport plane. In the exemplary embodiment shown, the transport plane is e.g., a horizontal plane. However, different arrangements would of course also be possible, e.g., vertical or inclined at a specific angle. The arrangement of the transport plane substantially depends on the respective use and field of application of the transport system 1. In the exemplary embodiment shown, the stator 2 comprises a plurality of drive modules 4, 41, **4*i*, which are adjacent to one another to form the transport plane. As a result, the transport system 1 can have a modular design and transport planes having differently sized surfaces can be produced. Of course, this modular design is only optional and the stator 2 could also consist of just one single drive module 4. One or more transport units 3 (not shown in FIG. 4 for reasons of clarity) can be moved at least two-dimensionally in the transport plane of the stator 2**.

The drive modules 4, 41, **4*i* again each have an airtight housing 6 in which the drive coils 5 of the respective drive module 4, 41, 4*i* are arranged. An electric current can be impressed into the drive coils 5 or a corresponding coil voltage can be applied, to the drive coils 5 to generate a magnetic field. The supply voltage V, which is connected to one of the drive modules 4, 41, 4*i*—in this case a first drive module 4—via the supply cable 8, is provided for the supply of electrical energy. A further or second drive module 41 of the stator 2 is then connected to this first drive module 4 via a power cable 21, to be supplied with voltage or energy via the first drive module 4, which is directly connected to the supply voltage V. A further drive module 4*i* is then connected to the second drive module 41 via a further power cable 21, and so on—until all drive modules 4, 41, 4*i* are at least indirectly connected to the supply voltage V via the power cables 21 and—as indicated by the dashed lines inside the drive modules 4, 41, 4*i*—are supplied with voltage or energy. The cabling comprising the supply cable 8 and the power cables 21 can additionally be used for signal transmission, provided the cables 8, 21 are designed for this purpose. The drive modules 4, 41, 4*i* again form what is known as a daisy chain, through the cabling via the power cables 21**.

The transport system 1 in the form of a planar motor also has an empty conduit 11 integrated in both, in the supply cable 8 and in the power cables 21, which connect the drive modules 4, 41, **4*i* to each other. The drive modules 4, 41, 4*i* also have airtight housings 6 and the connections between the first drive module 4 and the supply cable 8 as well as the connections between the power cables 21 and the drive modules 4, 41, 4*i* are also airtight. As a result, a medium or air exchange and the associated pressure equalization between the drive modules 4, 41, 4*i* can take place only via the empty conduit 11 in the respective power cable 21. A medium or air exchange and the associated pressure equalization with the environment 12 (e.g., switch cabinet interior) then takes place via the empty conduit 11 of the supply cable 8 connecting the first drive module 4 and the voltage supply V. I.e., that the air exchange with the environment 12 (e.g., switch cabinet interior) takes place via the empty conduit 11 for all drive modules 4, 41, 4*i*, the air being exchanged between the drive modules 4, 41, 4*i* connected via the power cables 21, and only the first drive module 4, which is connected to the supply voltage V, exchanging the air with the environment 12 of the supply voltage V. For this purpose, the empty conduit 11 integrated in the supply cable 8 ends at the supply-side end 9 of the supply cable 8 with an opening to the environment 12 of the supply voltage V—e.g., the interior of the switch cabinet. The pressure between the drive modules 4, 41, 4*i* is also equalized via the empty conduits 11 in the power cables 21. A pressure equalization with the environment 12 takes place via the empty conduit 11 in the supply cable 8 between the first drive module 4, connected to the supply voltage V, and the environment 12 of the supply voltage V. Here, too, the drive modules 4, 41, 4*i* are protected from possible adverse influences (e.g., dirt, moisture, etc.) by the environment 12** of the supply voltage V (e.g., switch cabinet interior), which is generally protected from moisture, dust or other contaminants.

LIST OF REFERENCE SIGNS

1 Electromagnetic transport system
2 Stator

3 Transport unit
4 Drive module
41 Further, second drive module
4*i* Further drive modules
Drive coils
6 Housing of the drive module
7 Control unit
8 Supply cable
9 Supply-side end of the supply cable
10 End of the supply cable on the drive module side
11 Empty conduit, capillary
12 Environment of a supply voltage or switch cabinet interior
13 Outer sheath
14 Braid, shielding
15 First power conductor
16 Second power conductor
17 Signal conductor
18 Signal conductor shielding/sheathing
19 Filling elements
20 Interior of the empty conduit
21 Power cable
22 First end of the power cable
23 Second end of the power cable
V Supply voltage

The invention claimed is:

1. An electromagnetic transport system comprising:

a stator comprising:

at least one drive module having an airtight housing, in which a plurality of drive coils are arranged, and a supply cable being provided, which connects the at least one drive module of the stator to a supply voltage for a voltage supply, wherein:

an empty conduit is integrated into the supply cable, the empty conduit is arranged inside an outer sheath of the supply cable, the empty conduit is provided with an opening at a supply-side end of the supply cable, and an end of the supply cable on the drive module side is connected to the at least one drive module in such a way that an exchange of a medium takes place between an interior of the at least one drive module formed by the airtight housing and an environment via the empty conduit;

at least one transport unit, which is arranged to be movable along the stator; and at least one further drive module which is connected to the at least one drive module via a power cable, an empty conduit also being integrated into the power cable, and a first end of the power cable being connected to the at least one drive module and a second end being connected to the at least one further drive module in such a way that an exchange of the medium takes place between an interior of the at least one further drive module formed by the airtight housing and the interior of the at least one drive module via the empty conduit in the power cable.

2. The transport system according to claim 1, wherein the empty conduit protrudes beyond the supply-side end of the supply cable at the supply-side end of the supply cable.

3. The transport system according to claim 1, wherein the at least one drive module and the at least one further drive module form a daisy chain through the connection with the power cable.

4. The electromagnetic transport system of claim 1, wherein the exchange of the medium is an air exchange.

5. The transport system according to claim 1, wherein the empty conduit is made of plastic material.

6. The transport system according to claim 5 wherein the plastic material is a polyamide plastic material.

7. The transport system according to claim 1, wherein a connection between the first end of the power cable and the at least one drive module, and a connection between the second end of the power cable and the at least one further drive module, is designed as a plug-in connection.

8. The transport system according to claim 7, wherein the plug-in connection between the end of the supply cable on the drive module side and the at least one drive module, is sealed using a union nut.

9. The transport system according to claim 7, wherein the plug-in connection between the first end of the power cable and the second end of the power cable and the drive module is sealed using a union nut.

10. The transport system according to claim 1, wherein a connection between the end of the supply cable on the drive module side and the at least one drive module is designed as a plug-in connection.

11. The transport system according to claim 10, wherein the plug-in connection between the end of the supply cable on the drive module side and the at least one further drive module is sealed using a union nut.

12. The transport system according to claim 10, wherein the plug-in connections between the first end of the power cable and the second end of the power cable and a respective drive module is sealed using a union nut.

* * * * *